United States Patent [19]

Burghardt et al.

[11] Patent Number: 4,871,222
[45] Date of Patent: Oct. 3, 1989

[54] REFLEX TRANSMITTER FOR A BIDIRECTIONAL LIGHT WAVEGUIDE COMMUNICATION SYSTEM

[75] Inventors: Hartmut Burghardt, Holzkirchen; Juergen Jahns, Erlangen; Stefan Kindt, Munich, all of Fed. Rep. of Germany

[73] Assignee: Siemens Aktiengesellschaft, Munich, Fed. Rep. of Germany

[21] Appl. No.: 226,882

[22] Filed: Aug. 1, 1988

[30] Foreign Application Priority Data

Jul. 31, 1987 [DE] Fed. Rep. of Germany ....... 3725479

[51] Int. Cl.⁴ .............................. G02B 6/10; G02B 6/28
[52] U.S. Cl. ............................... 350/96.14; 350/96.16; 455/612
[58] Field of Search ............... 350/96.13, 96.14, 96.15, 350/96.16; 455/610, 612

[56] References Cited

U.S. PATENT DOCUMENTS

| | | | |
|---|---|---|---|
| 4,195,269 | 3/1980 | Ettenberg et al. | 332/7.51 |
| 4,291,939 | 9/1981 | Giollorenzi et al. | 350/96.14 |
| 4,436,365 | 3/1984 | Hodgins et al. | 350/96.16 |
| 4,492,425 | 1/1985 | Kersten et al. | 350/96.13 |
| 4,667,331 | 5/1987 | Alferness et al. | 350/96.14 |
| 4,712,859 | 12/1987 | Albanese et al. | 350/96.16 |

FOREIGN PATENT DOCUMENTS 2708606  8/1978  Fed. Rep. of Germany .

OTHER PUBLICATIONS

Optics Communications, 15 Feb. 1981, "180° Turns in Integrated Optics", Tietgen et al., pp. 281–284.
Duthie et al, Electronics Letters, 8 May 1986, vol. 22, No. 10, pp. 517 and 518.
Wheeler et al, Electronics Letters, vol. 22, No. 9, Apr. 1986, pp. 479–481.
Auracher et al, "Entwicklungstendenzen der Integrierten Optik", Telcom Report 10, 1987, pp. 90–98.

Primary Examiner—James W. Davie
Attorney, Agent, or Firm—Hill, Van Santen, Steadman & Simpson

[57] ABSTRACT

A bidirectional light waveguide communication system that has a light source preferably formed by a laser at one end of the light waveguide and a reflex transmitter at the other end of the waveguide with the reflex transmitter formed by a halved controllable optical directional coupler which has two strip waveguides that are terminated by a partially reflecting mirror and which has control electrodes which receive a transmission signal. An opto-electrical transducer receives the received light signal from both strip waveguides after the partially reflecting mirror.

4 Claims, 1 Drawing Sheet

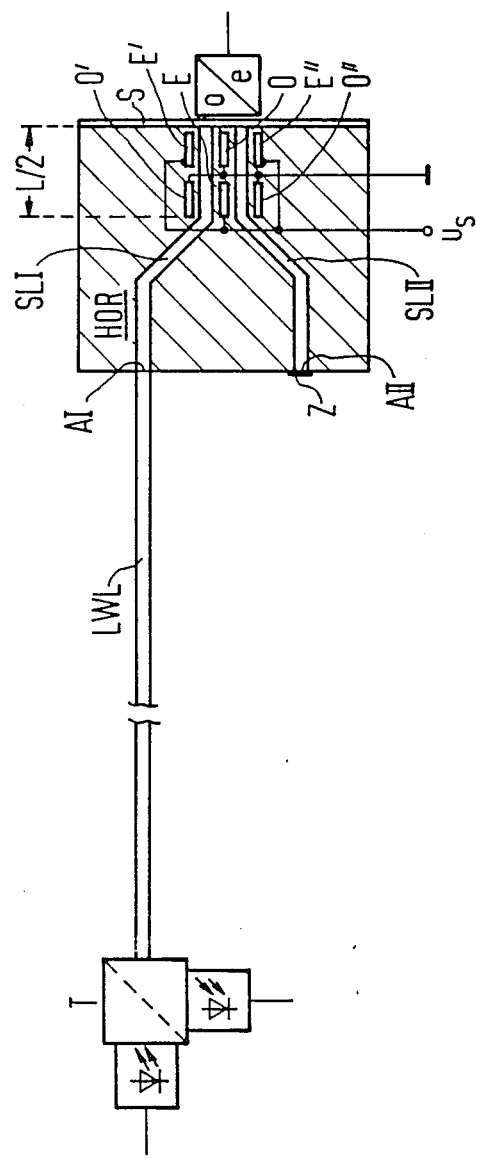

REFLEX TRANSMITTER FOR A BIDIRECTIONAL LIGHT WAVEGUIDE COMMUNICATION SYSTEM

BACKGROUND OF THE INVENTION

1. Field of the Invention

This invention relates in general to a reflex transmitter for a bidirectional light waveguide communication systems and in particular to a novel communication system.

2. Description of the Prior Art

In bidirection communication systems formed from monomode light waveguides, it is possible to provide a light source or light sources at only one end of the light waveguide link and to provide reflection means as well as an optical modulator at the other end of the light waveguide link as is disclosed in U.S. Pat. No. 4,195,269 particularly at column 2, lines 32-44 and 51-55. See also German DE A No. 2 708 606. Also see Electronic Letters 22 1986, Vol. 9, Pages 479-481, Electronic Letters 8 May 1986, Vol. 22 No. 10, Page 517 and 518. Entwicklungstendenzen Der Integrierten Optik in Telecom Report 10 1987, Pages 90-98 by Franz Auracher et al, Optics Communication, Vol. 36, No. 4, 15 February 1981, Pages 281-284. U.S. Pat. No. 4,291,939, U.S. Pat. No. 4,436,365.

An optical intensity modulator can be formed with a controllable optical directional coupler as described in Telecom Report 10 (1987) to Pages 90-98 in FIGS. 8 and 9. Such an optical directional coupler includes two identical optical strip waveguides which are narrow thin strips formed in a substrate by injection of, for example, titanium into lithium niobate and the strips have a higher optical refractive index than the substrates. These strips are spaced in close proximity at a distance of typically 5 um from each other over a defined length so that the optical fields of waves guided in the strip waveguides overlap and periodically repeated with what is referred to as the coupling length light energy is coupled from one to the other strip waveguides. Electrodes are provided between and next to the strip waveguides and an electrical external field is generated between the electrodes which cause changes in the refractive index referred to as the electro-optical effect and, thus, in the propagation speed and in the scatter with the consequence that corresponding changes in the cross-over of light energy also occurs.

SUMMARY OF THE INVENTION

It is an object of the present invention to disclose especially expedient optical modulator and reflection means for a directional light waveguide communication system comprising one or more light sources at only one end of the light waveguide.

The invention is directed to a reflex transmitter for a bidirectional light waveguide communication system that has a light source or light sources preferably formed by a laser or lasers at only one end of the light waveguide and the reflex transmitter is formed as a halved controllable optical directional coupler which is connected to the light waveguide at its one input/output and the two strip waveguides of the optical directional coupler are terminated with a partially reflecting mirror and control electrodes are adjacent the two strip waveguides and receive the transmission signal. In a further development of the invention an opto-electrical transducer receives the received optical signal from both strip waveguides following the partially reflecting mirror.

It is known from German A No. 3 108 814, FIGS. 1 and 2, as well as from the publication entitled "Optics Communication" 36 (1981) 4, Pages 281-284 in FIGS. 2 and 3 to form a 180° deflector with a halved directional coupler which has an end face that could be fully mirrored in order to achieve a loss-free 180° deflection. Problems with respect to a bidirectional communication system and to a modulation to be effected of a light wave train which is reflected back onto itself are thereby not touched upon; however, the present invention discloses a method of solving the same.

In addition to the advantages of an attenuation of the light that is halved as compared to a directional coupler of a conventional structure where the gain can be in the order of magnitude of a few dB, the invention produces the further advantage that the material as well as the space required is practically cut in half. It is also advantageous in that an optimum spatial matching to a fast photo detector is possible and the two immediately proximate strip waveguides of the halved directional coupler can be covered through the partially reflecting mirror with the photo-active surface of a single photo-detector so that the cost can also be cut in half in this respect.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

The FIG. shows schematically a partially sectional view of an embodiment of a reflex transmitter of the invention.

DESCRIPTION OF THE PREFERRED EMBODIMENTS

The FIG. schematically shows an exemplary embodiment of a reflex transmitter which comprises a halved controllable optical directional coupler HOR which has its one input/output AI connected to a light waveguide LWL. The light waveguide LWL may be a component part of a bidirectional light waveguide communication system and the other end may be connected to a transmitter having an electro-optical transducer as, for example, a laser diode 10 and a receiver 11 having an opto-electrical transducer, for example, a PIN diode which are connected to the light waveguide LWL by way of a beam splitter T. At the right end shown in the drawing, the bidirectional light waveguide communication system does not utilize a separate light source as a transmitter, but comprises a reflex transmitter formed by halved controllable optical directional coupler HOR that can be modulated by a transmission signal which is to be transmitted toward the other end of the bidirectional light waveguide communication system.

The halved controllable optical directional coupler HOR includes two strip waveguides SLI and SLII which are formed by injecting into a substrate lithium niobate. One of the waveguides SLI has its input/output AI connected to the light waveguide LWL. In the actual coupling region comprising a length L/2, the two strip waveguides SLI and SLII are situated closely adjacent to each other and are spaced typically about 5um so that light energy can be coupled from one strip waveguide SLI to the other strip waveguide SLII and vice versa. The two strip waveguides SLI and SLII are terminated by a partially reflecting mirror S behind which is mounted the opto-electrical transducer o/e of a receiver which is not shown in greater detail. The close proximity and the small cross-section of the two strip waveguides SLI and SLII make it possible that both strip waveguides are connected to the active surface of one and the same opto-electrical transducer o/e which may be realized, for example, with a PIN diode.

A plurality of control electrodes E, E', E", O, O' and O" of the halved controllable optical directional coupler HOR are located next to and between the strip waveguides SLI and SLII These electrodes receive the transmission signal, for example, 140-M bit/s signal which is to be transmitted by the light waveguide LWL. As is indicated in the drawing, the electrodes can be oppositely polarized in certain sections such as is known in the case of $\Delta\beta$ reversal directional couplers. This creates better electrical balancing and enables a nearly 100% modulation to be achieved.

The reflex transmitter illustrated in the drawing functions in the following manner. A light signal at a frequency of, for example, 565M bit/s per second preferably having a low degree of modulation as, for example, 10% that is transmitted from the cooperating side of the LWG communications system enters into the strip waveguide SLI at the input/output AI and has a greater or lesser part of its intensity coupled over onto the strip waveguide SLII in the coupling region L/2 of the halved controllable optical directional coupler, said part being coupled into the other waveguide based on the amount of the transmission voltage $u_s$ between the control electrodes E, E', E', O, O' and O". The sum of the light intensities in the two strip waveguides SLI and SLII remain equal to the intensity of the light signal received by way of the light waveguide LWL. The part of the reception light signal which is guided in the two strip waveguides SLI and SLII that corresponds to the transmissvity of the partially reflecting mirror S of, for example, about 15% and that passes to the partially reflecting mirror S and passes through the opto-electrical transducer o/e which is mounted behind the mirror is thus independent of the transmission signal that is adjacent at the control electrodes E, E', E", O, O' and O".

That part of the light which is guided in the two strip waveguides SLI and SLII that did not reach the opto-electrical transducer o/e and that corresponds to the reflectivity of the partially reflecting mirror S, about 85% in the example, is reflected at the partially reflecting mirror S and again passes through the coupling region L/2 where a more or less intense cross-over between the strip waveguides SLI and SLII again occurs based on the amount of the transmission voltage $u_s$ adjacent the control electrodes E, E', E", O, O' and O".

In total, the cross-over effect between the two strip waveguides SLI and SLII which is controlled by the transmission signal acts like an intensity modulation preferably having a high degree of modulation of, for example, about 100% of the light that passes again to the input/output AI of the strip waveguide SLI and, thus, proceeds back into the light waveguide LWL where it is then transmitted in the return direction to the other end of the LWG communication system. Depending on the momentary value of the transmission signal all the light can then pass back to the input/output AI of the strip waveguide SLI and, thus, back into the light waveguide LWL in one boundary case and in the other boundary case, at least when the length L/2 of the coupling region is equal to an uneven multiple of half of what is referred to as the coupling length $L_0$ when, thus, L/2 equals $(2n+1 \times L_0/2$ with n=0, 1, 2... all of the light can be coupled to the strip waveguide SLII. The single coupling length $L_0$ is determined by what is referred to as the coupling constant k where $L_0 = \pi/2k$ itself is dependent on the geometrical property such as the width and diameter of the strip waveguides. Generally, assuming a momentary value of the transmission signal lying between the boundary values, the system will operate between the above-described boundary conditions.

So as to avoid disturbing reflections in the strip waveguide SLII, the input/output AII is expediently terminated with a light absorber which completely absorbs the light impinging on it proceeding from the strip waveguide SLII and such light absorbing layer is referenced Z in the drawing.

So as to achieve independence of the polarization direction of the light which is incoming by way of the light waveguide LWL, a specific section of the LiNbO₃ crystal for which the electro-optical coefficients for the TE mode and TE mode are identical can be used for a LiNbO₃ substrate in which the strip waveguides SLI and SLII are formed by the injection of titanium.

In summary, it should be noted that though the exemplary embodiment of a reflex transmitter of the invention shown in the drawing provides directional coupler electrodes which receive the transmission signal and are oppositely polarized in certain sections the invention is not limited to such structure, but an arrangement that only provides simple control electrodes arranged next to or between the strip waveguides can also be utilized where the electrodes then extend over the entire coupling region L/2.

Although the invention has been described with respect to preferred embodiments, it is not to be so limited as changes and modifications may be made therein which are within the full intended scope of the invention as defined by the appended claims.

We claim as our invention:

1. A reflex transmitter for a bi-directional waveguide communications system having a light source of light sources preferably formed by a laser or lasers at only one end of said light waveguide, characterized in that said reflex transmitter comprises a substrate having a pair of strip waveguides mounted thereon and arranged in a form of one-half of a controllable optical directional coupler (HOR) that has its input/output (AI) connected to said light waveguide (LWL), said pair of strip waveguides (SLI, SLII) arranged in a form of one-half of a controllable optical directional coupler terminated with a partially reflecting mirror (S), and control electrodes (E,O) mounted adjacent said pair of strip waveguides and said control electrodes supplied with a signal which is to be transmitted.

2. A reflex transmitter according to claim 1, wherein an opto-electrical transducer (o/e) receives a light signal from said pair of two strip waveguides (SLI, SLII) is mounted adjacent the partially reflecting mirror (S).

3. A reflex transmitter according to claim 1 or 2, wherein another input/output (AII) of said directional coupler (HOR) is terminated with a light absorber (Z).

4. A reflex transmitter according to claim 1 or 2 wherein said control electrodes (E,O) receive said signal which is to be transmitted and said control electrodes are opposite polarized.

* * * * *